(12) United States Patent
Lipkin et al.

(10) Patent No.: US 9,561,986 B2
(45) Date of Patent: Feb. 7, 2017

(54) SILICA-FORMING ARTICLES HAVING ENGINEERED SURFACES TO ENHANCE RESISTANCE TO CREEP SLIDING UNDER HIGH-TEMPERATURE LOADING

(71) Applicant: GENERAL ELECTRIC COMPANY, Schenectady, NY (US)

(72) Inventors: Don Mark Lipkin, Schenectady, NY (US); Curtis Alan Johnson, Niskayuna, NY (US); Peter Joel Meschter, Franklin, TN (US); Sairam Sundaram, Niskayuna, NY (US); Julin Wan, Rexford, NY (US)

(73) Assignee: General Electric Company, Niskayuna, NY (US)

( * ) Notice: Subject to any disclaimer, the term of this patent is extended or adjusted under 35 U.S.C. 154(b) by 34 days.

(21) Appl. No.: 14/068,693

(22) Filed: Oct. 31, 2013

(65) Prior Publication Data

US 2015/0118443 A1    Apr. 30, 2015

(51) Int. Cl.
*C04B 41/45*    (2006.01)
*C04B 41/00*    (2006.01)
(Continued)

(52) U.S. Cl.
CPC .............. *C04B 41/009* (2013.01); *C04B 41/52* (2013.01); *C04B 41/89* (2013.01); *F01D 5/288* (2013.01);
(Continued)

(58) Field of Classification Search
CPC ............ F05D 2260/95; F05D 2250/181; C04B 41/009; C04B 41/52; C04B 41/89; F01D 5/288; Y10T 428/24537
(Continued)

(56) References Cited

U.S. PATENT DOCUMENTS 6,200,691 B1 *  3/2001  Moore .................. C03B 5/1672
                                                                428/615
6,296,941 B1   10/2001  Eaton, Jr. et al.
(Continued)

FOREIGN PATENT DOCUMENTS

EP    1044943 A1    10/2000
EP    2615250 A1    7/2013
(Continued)

OTHER PUBLICATIONS

D.R. Mumm, A.G. Evans, and I.I Spitsberg Characterization of a Cyclic Displacement Instability for a Thermally Grown Oxide in a Thermal Barrier System. 2001. Elsevier Acta Materialia pp. 2329-2340.*

(Continued)

*Primary Examiner* — Aaron Austin
*Assistant Examiner* — Laura Figg
(74) *Attorney, Agent, or Firm* — John P. Darling

(57) ABSTRACT

An article includes a silicon-containing region; at least one outer layer overlying a surface of the silicon-containing region; and a constituent layer on the surface of the silicon-containing region and between and contacting the silicon-containing region and the at least one outer layer, the constituent layer being formed by constituents of the silicon-containing region and being susceptible to creep within an operating environment of the article, wherein the silicon-containing region defines a plurality of channels and a plurality of ridges that interlock within the plurality of channels are formed in the silicon-containing region to physically interlock the at least one outer layer with the silicon-containing region through the constituent layer.

11 Claims, 10 Drawing Sheets

(51) Int. Cl.
*C04B 41/89* (2006.01)
*C04B 41/52* (2006.01)
*F01D 5/28* (2006.01)

(52) U.S. Cl.
CPC .. *F05D 2250/181* (2013.01); *Y10T 428/24537* (2015.01)

(58) Field of Classification Search
USPC .................................................. 428/163, 698
See application file for complete search history.

(56) References Cited

U.S. PATENT DOCUMENTS

| | | |
|---|---|---|
| 6,299,988 B1 | 10/2001 | Wang et al. |
| 6,361,878 B2 | 3/2002 | Ritter et al. |
| 6,410,148 B1 | 6/2002 | Eaton, Jr. et al. |
| 6,444,331 B2 | 9/2002 | Ritter et al. |
| 6,544,665 B2 | 4/2003 | Rigney et al. |
| 6,630,200 B2 | 10/2003 | Wang et al. |
| 6,682,820 B1 * | 1/2004 | Pujari ........................ 428/426 |
| 6,726,444 B2 | 4/2004 | Zhao et al. |
| 6,902,836 B2 | 6/2005 | Eaton et al. |
| 7,056,574 B2 | 6/2006 | Ojard et al. |
| 7,150,921 B2 | 12/2006 | Nelson et al. |
| 7,704,596 B2 | 4/2010 | Merrill et al. |
| 7,763,356 B2 | 7/2010 | Bercik et al. |
| 7,927,714 B2 | 4/2011 | Carter et al. |
| 2010/0047615 A1 | 2/2010 | Carter et al. |
| 2010/0189911 A1 | 7/2010 | Berczik et al. |
| 2010/0236758 A1 | 9/2010 | Ullman et al. |
| 2011/0033284 A1 | 2/2011 | Tryon et al. |
| 2011/0217511 A1 * | 9/2011 | Kirby ..................... C04B 35/14 428/141 |
| 2013/0122259 A1 | 5/2013 | Lee |

FOREIGN PATENT DOCUMENTS

| | | |
|---|---|---|
| WO | 9943861 A1 | 9/1999 |
| WO | 2010123602 A1 | 10/2010 |
| WO | WO 2011085376 A1 * | 7/2011 ............ C23C 28/00 |
| WO | 2012122373 A1 | 9/2012 |
| WO | 2014092916 A1 | 6/2014 |

OTHER PUBLICATIONS

B. Tyron et al., "Hybrid intermetallic Ru/Pt-modified bond coatings for thermal barrier systems," Science Direct, Surface & Coatings Technology, vol. 202, Jun. 2007, pp. 349-361.

B. Tyron et al., "Multilayered Ruthenium-Modified Bond Coats for Thermal Barrier Coatings," Metallurgical and Materials Transactions A, vol. 37A, Nov. 2006, pp. 3347-3358.

* cited by examiner

SILICA-FORMING ARTICLES HAVING ENGINEERED SURFACES TO ENHANCE RESISTANCE TO CREEP SLIDING UNDER HIGH-TEMPERATURE LOADING

GOVERNMENT INTEREST

The present technology was developed with Government support under Contract No. DE-FC26-05NT42643 awarded by the Department of Energy. The Government may have certain rights in the claimed inventions.

INCORPORATION BY REFERENCE

The contents of commonly assigned U.S. application Ser. No. 13/711,250, filed Dec. 11, 2012 and titled ENVIRONMENTAL BARRIER COATINGS AND METHODS THEREFOR, are incorporated herein by reference.

BACKGROUND OF THE TECHNOLOGY

The present technology generally relates to coating systems and methods suitable for protecting components exposed to high-temperature environments, such as the hostile thermal environment of a turbine engine. More particularly, this technology is directed to an Environmental Barrier Coating (EBC) on a silicon-containing region of a component and to the incorporation of surface features in the silicon-containing region to inhibit creep displacement of the EBC when subjected to shear loading at elevated temperatures.

Higher operating temperatures for turbine engines are continuously sought in order to increase their efficiency. Though significant advances in high temperature capabilities have been achieved through formulation of iron, nickel and cobalt-base superalloys, alternative materials have been investigated. Ceramic composite materials are currently being considered for such high temperature applications as combustor liners, vanes, shrouds, blades, and other hot section components of turbine engines. Some examples of ceramic composite materials include silicon-based composites, for example, composite materials in which silicon, silicon carbide (SiC), silicon nitride ($Si_3N_4$), and/or a silicide serves as a reinforcement phase and/or a matrix phase.

In many high temperature applications, a protective coating is beneficial or required for a Si-containing material. Such coatings should provide environmental protection by inhibiting the major mechanism for degradation of Si-containing materials in a water-containing environment, namely, the formation of volatile silicon hydroxide (for example, $Si(OH)_4$) products. A coating system having these functions will be referred to below as an environmental barrier coating (EBC) system. Desirable properties for the coating material include a coefficient of thermal expansion (CTE) compatible with the Si-containing substrate material, low permeability for oxidants, low thermal conductivity, stability and chemical compatibility with the Si-containing material.

The silicon content of a silicon-containing bondcoat reacts with oxygen at high temperatures to form predominantly an amorphous silica ($SiO_2$) scale, though a fraction of the oxide product may be crystalline silica or oxides of other constituents of the bondcoat and/or EBC. The amorphous silica product exhibits low oxygen permeability. As a result, along with the silicon-containing bondcoat, the silica product that thermally grows on the bondcoat is able to form a protective barrier layer.

The amorphous silica product that forms on a silicon-containing bondcoat in service has a relatively low viscosity and consequently a high creep rate under shear loading. High shear loads (e.g. from about 0.1 to 10 MPa) can be imposed by g forces (e.g. from about 10,000 to about 100,000 g's) resulting from high-frequency rotation of moving parts, such as blades (buckets) of turbine engines. Such shear loading may cause creep displacements of the EBC relative to the bondcoat and substrate which can result in severe EBC damage and loss of EBC protection of the underlying substrate.

BRIEF DESCRIPTION OF THE TECHNOLOGY

The present technology provides an environmental barrier coating (EBC) system and a method of fabricating the EBC system on an article formed of a silicon-containing material, such as a ceramic matrix composite (CMC) in which a silicon-containing material serves as a reinforcement phase and/or a matrix phase. The EBC system and method are particularly well suited for protecting silicon-containing articles exposed to high temperatures, including the hostile thermal environment of a turbine engine.

According to one example of the technology, an article comprises a silicon-containing region; at least one outer layer overlying a surface of the silicon-containing region; and a constituent layer (i.e. a thermally grown oxide, or TGO, layer) on the surface of the silicon-containing region and between and contacting the silicon-containing region and the at least one outer layer, the constituent layer being at least partially formed by constituents of the silicon-containing region and being susceptible to creep within an operating environment of the article, wherein the bondcoat and/or substrate defines a plurality of channels and a plurality of ridges that interlock within the plurality of channels are formed in the silicon-containing region to physically interlock the at least one outer layer with the silicon-containing region through the constituent layer.

By interlocking the silicon-containing region with an initial layer of the environmental barrier coating system, displacement of the EBC attributable to creep of the constituent layer, for example, a silica layer that thermally grows on the silicon-containing region or layer, can be substantially inhibited, thereby promoting the structural integrity of the environmental barrier coating system and its ability to protect the article in high temperature applications. The technology is applicable to use with known environmental barrier coating materials and the interlocking features can be produced using various processes.

BRIEF DESCRIPTION OF THE DRAWINGS

These and other features, aspects, and advantages of the present technology will become better understood when the following detailed description is read with reference to the accompanying drawings in which like characters represent like parts throughout the drawings, wherein.

DETAILED DESCRIPTION

The present technology is generally applicable to components that operate within environments characterized by relatively high temperatures, stresses, and oxidation. Notable examples of such components include high and low pressure turbine vanes (nozzles) and blades (buckets), shrouds, combustor liners, augmentor hardware, and other hot section components of turbine engines, though the technology has application to other components.

Figure 1:
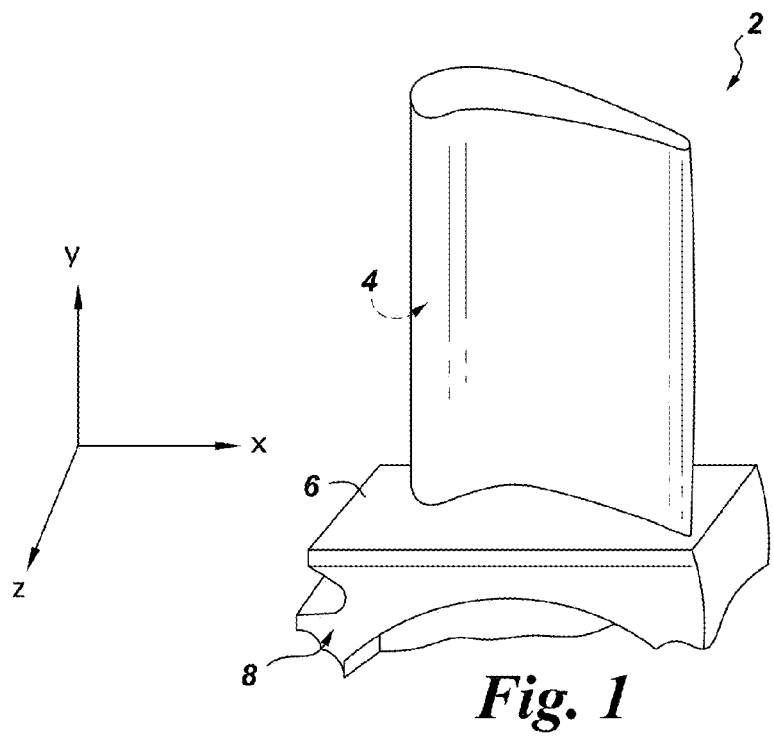
FIG. 1 schematically depicts an article or component that may be coated with coatings of the present technology and according to methods of the present technology.
Figure 2:
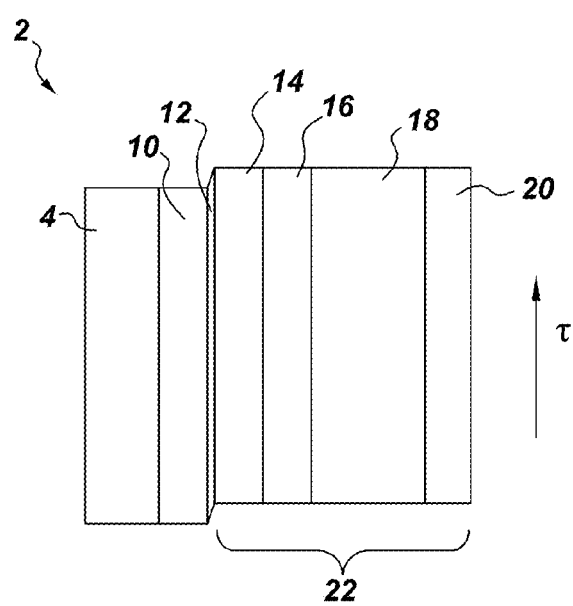
FIG. 2 schematically depicts a section of the article or component of FIG. 1 including a coating according to an example of the present technology.

Referring to FIGS. 1 and 2, an article or component 2, for example a turbine bucket or blade, may include an Environmental Barrier Coating (EBC) system 22 to protect the article or component when operated in a high-temperature, chemically reactive environment. The component 2 may include a substrate 4, for example an airfoil section, extending from a platform 6. The platform 6 may include a mounting and securing structure 8 configured to mount and secure the component to a rotating element, such as a rotor (not shown). The substrate 4 may include a silicon containing region. Examples of silicon-containing materials include those with a silicon carbide, silicon nitride, a silicide (for example, a refractory metal or transition metal silicide, including, but not limited to, for example Mo, Nb, or W silicides) and/or silicon as a matrix or second phase. Further examples include ceramic matrix composites (CMC) that contain silicon carbide as the reinforcement and/or matrix phase.

The EBC system 22 of FIG. 2 represents one of a variety of different EBC systems shown as being directly applied to a surface of the substrate 4. A silicon-containing bondcoat is disclosed in, for example, U.S. Pat. No. 6,299,988. The bondcoat 10 is further represented as bonding a first EBC layer 14 to the substrate 4, and optionally at least one additional layer 16, 18, 20 of the EBC system 22. The EBC system 22 provides environmental protection to the underlying substrate 4. It may also reduce the operating temperature of the component 2, thereby enabling the component 2 to operate at higher gas temperatures than otherwise possible. While FIG. 2 represents the component 2 as including the silicon-containing bondcoat 10, in which case the first EBC layer 14 is deposited directly on a silicon-containing surface region formed by the bondcoat 10, the technology is also applicable to a component 2 that does not include a bondcoat 10 as described herein, in which case the first EBC layer 14 may be deposited directly on a silicon-containing surface region formed by the substrate 4. It should be appreciated that a constituent layer 12, or a portion of the constituent layer 12, described in more detail below, may be present prior to application of the first EBC layer 14.

Degradation of a silicon-containing material in a combustion environment results in reaction with water vapor to form volatile silicon hydroxide (for example, $Si(OH)_4$) products. The EBC system 22 may serve to resist recession by chemical reaction of the bondcoat 10 and/or substrate 4 with water vapor, provide a temperature gradient to reduce the operating temperature of the component 2, or both. Suitable EBC systems usable with the present technology include, but are not limited to, those disclosed in, for example, U.S. Pat. No. 6,296,941 and U.S. Pat. No. 6,410,148. The EBC system 22 may perform a multitude of sealing, reaction barrier, recession resistance, and/or thermal barrier functions.

As noted above, each of the bondcoat 10 and substrate 4 may define a surface region of the component 2 that contains silicon. For example, the bondcoat 10 may comprise or consist essentially of elemental silicon. Alternatively, the bondcoat 10 may contain silicon carbide, silicon nitride, metal silicides, elemental silicon, silicon alloys, or mixtures thereof. Bondcoat 10 may further contain oxide phases, such as silica, rare earth silicates, rare earth aluminosilicates, and/or alkaline earth aluminosilicates. The use of silicon-containing compositions for the bondcoat 10 improves oxidation resistance of the substrate 4 and enhances bonding between the substrate 4 and first EBC layer 14. The silicon of the bondcoat 10 reacts with oxygen at elevated temperatures to thermally grow the constituent layer 12 of predominantly amorphous silica ($SiO_2$) on its surface, as schematically represented in FIG. 2. The resulting thermally grown oxide of amorphous silica exhibits low oxygen permeability. As a result, along with the silicon-containing bondcoat 10, the constituent layer 12 is able to deter permeation of oxygen into the bondcoat 10 and substrate 4. During growth of the constituent layer 12, some of the amorphous silica may crystallize into crystalline silica and additional impurity elements and second phases can be incorporated therein.

In the absence of the silicon-containing bondcoat 10, the first layer 14 of the EBC system 22 can be deposited directly on a silicon-containing surface region of the component 2 defined by the substrate 4, in which case the substrate 4 is formed to have a composition whose silicon content is sufficient to react with oxygen at elevated temperatures and form a silica-rich constituent layer 12 described above. Furthermore, depending on the composition of the substrate 4, this layer may be a predominantly amorphous silica product, a silica-rich glass, or a multi-phase mixture wherein at least one of the phases is silica-rich. As a matter of convenience, the remaining disclosure will make reference to embodiments that include the bondcoat 10 as represented in FIG. 2, though the disclosure should be understood to equally apply to a constituent layer 12 that forms on the surface of the substrate 4.

The constituent layer 12 that forms on the silicon-containing bondcoat 10 or another silicon-containing surface region, such as the substrate 4, during high temperature service may grow to thicknesses of up to about 50 μm or more, depending on the application. The constituent layer 12 may have a relatively low viscosity and consequently a high creep rate under shear loading τ that can be imposed by g forces that occur during rotation of components, such as blades (buckets) of turbine engines. As a result of creep of the constituent layer 12, displacements of the overlying EBC system 22 relative to the substrate 4 can exceed 100 mm over 25,000 hours service at about 1315° C. (about 2400° F.). Such large creep displacements can result in severe damage to the EBC system 22 and direct loss of environmental protection of the underlying substrate 4.

Figure 3:
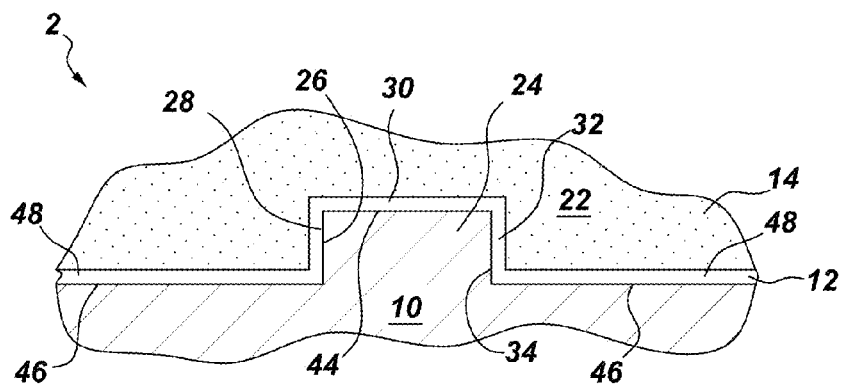
FIG. 3 schematically depicts an engineered surface of a bondcoat of the article or component according to one example of the present technology in a first state.

Referring to FIGS. 3-7, creep of the constituent layer 12 that forms on the silicon-containing bondcoat 10 (or, in the absence of the bondcoat 10, on the surface of the substrate 4) may be inhibited by providing the surface of the bondcoat 10 with surfaces or features 24 configured to mitigate creep of the constituent layer 12. As shown in FIG. 3, the surface features may take the form of ridges 24 that are formed by processes described in co-pending, commonly assigned U.S. application Ser. No. 14/068,840 entitled, "METHODS OF MANUFACTURING SILICA-FORMING ARTICLES HAVING ENGINEERED SURFACES TO ENHANCE RESISTANCE TO CREEP SLIDING UNDER HIGH-TEMPERATURE LOADING" the entire contents of which are incorporated herein by reference. Each ridge 24 may include a leading edge 26 that forms a leading edge channel 28 between the first layer 14 of the EBC system 22 and the ridge 24. It should be appreciated that the terms "leading" and "trailing" are for illustrative purposes only to describe the relative relationships of the edges with respect to a direction in which a shear loading τ may be applied to the EBC system 22, for example by rotation of the article 2.

Each ridge 24 may also include a trailing edge 34 that defines a trailing edge channel 32 between the first layer 14 of the EBC system 22 and the ridge 24. Each ridge 24 may further include a top edge 44 that defines a channel 30 between the ridge 24 and the first layer 14 of the EBC system 22. It should be appreciated that the use of the term "top" is for illustrative purposes only and is not intended to connote any particular orientation of the edge 44 with respect to the substrate 4 or the component or article 2.

The formation or growth of the constituent layer 12 forms a channel 48 between the bondcoat 10 and the first layer 14 of the EBC system 22. The channel 48 may include the leading edge channel 28 and the trailing edge channel 32 formed between the leading edge 26 and the trailing edge 34 of the ridge 24, respectively, and the first layer 14 of the EBC system 22. The channel 48 may further include the connecting channel 30 extending from the leading edge channel 28 to the trailing edge channel 32 that is defined between the top surface 44 of the ridge 24 and the first layer 14 of the EBC system 22.

Figure 4:
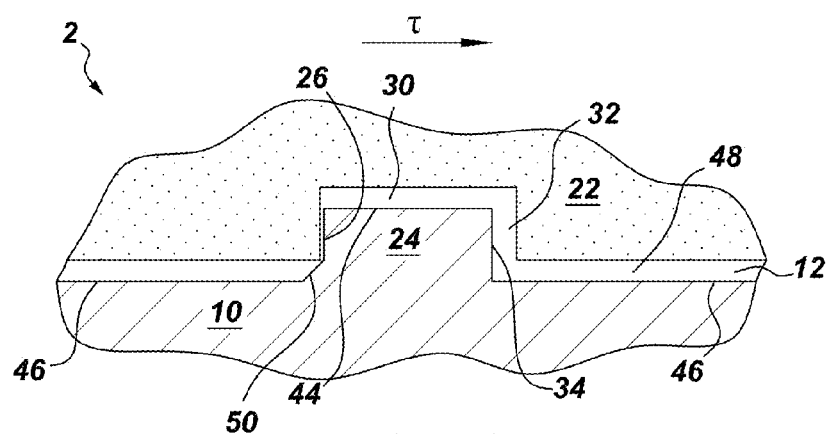
FIG. 4 schematically depicts the engineered surface of FIG. 3 in a second state.
Figure 5:
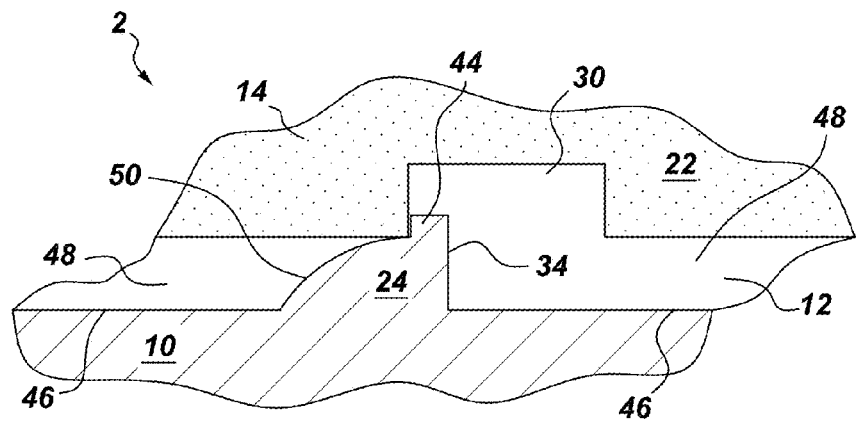
FIG. 5 schematically depicts the engineered surface of FIG. 3 in a third state.

As shown in FIG. 4, application of a shear loading τ to the article 2, e.g. by rotation of the component 2, may cause a viscous shear of the constituent layer 12, which may be an amorphous silica product, a silica-rich glass, or a multi-phase mixture wherein one of the phases is silica-rich glass. The viscous shear of the constituent layer 12 results in a flow of the constituent layer 12 along the channel 48, 28, 30, 32 and accelerated oxidation of the leading edge 26 of the ridge 24. Continued operation (i.e. rotation) of the component in a gas turbine results in continued growth of the constituent layer 12, viscous shear and flow of the oxide from the leading edge 26 through the channel 48, 28, 30, 32, and oxidation of the leading edge 26 of the ridge 24 of the bondcoat 10. As shown in FIG. 5, the oxidized leading edge 50 of the ridge 24 and the first layer 14 of the EBC system 22 may nearly contact after operation and narrow the channel to limit the creep of the EBC system 22.

Figure 6:
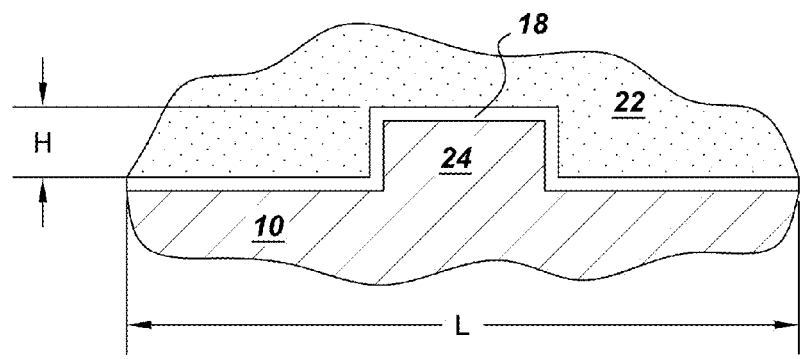
FIG. 6 schematically depicts an engineered surface of a bondcoat of the article or component according to another example of the present technology.
Figure 7:
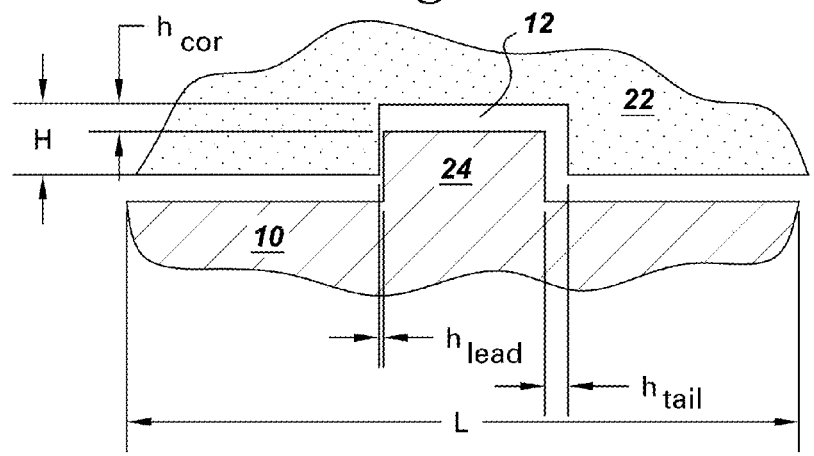
FIG. 7 schematically depicts an engineered surface of a bondcoat of the article or component according to another example of the present technology.

Referring to FIG. 6, the ridge 24 of the bondcoat 10 may have a height, or amplitude, H and a wavelength L. Although only one ridge is shown in FIG. 6, referring to FIG. 9 it should be appreciated that the bondcoat 10 may include ridges 24 of height H and wavelength L in a direction substantially perpendicular to the axis of rotation/acceleration to mitigate creep sliding of the EBC system 22 over the bondcoat 10 and/or substrate 4. As discussed further, the dimensions of the ridges are determined to provide sufficient sliding resistance as required to complete a service interval (e.g. 25,000 hours) for a spinning component.

The constituent layer 12 may have a thickness h that varies from a leading edge thickness $h_{lead}$ to a trailing edge thickness $h_{trail}$. The thickness $h_{con}$ of the constituent layer 12 will vary during use of the component as the bondcoat 10 continues to oxidize during operation of the turbine. The flow of the constituent layer 12 during operation may be modeled using an analytical model or Finite Element Analysis (FEA). In the models, a balancing of forces relates channel pressures to the applied shear stress, and the Poiseuille flow relates the channel flow velocities to the channel pressures. The principle of volume conservation relates channel flow velocities to a sliding velocity of the EBC system 22. These principles provide the relationship between the sliding velocity and the applied shear stress.

Figure 8:
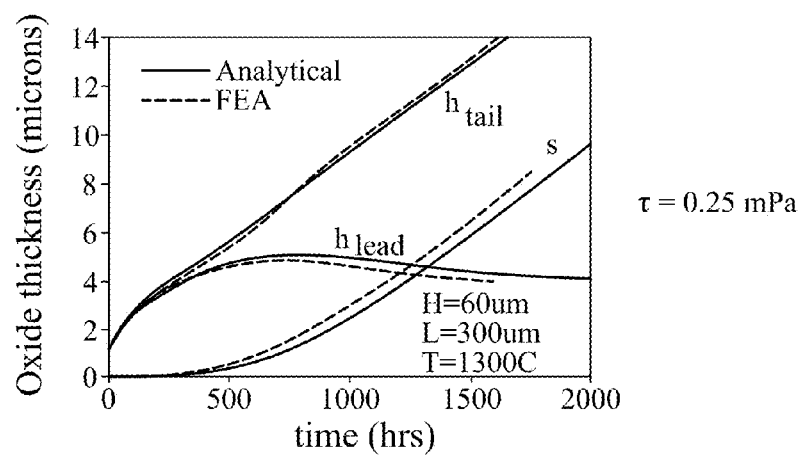
FIG. 8 depicts a thickness of a thermally grown oxide layer of a coating of the article or component according to one example of the present technology.
Figure 10:
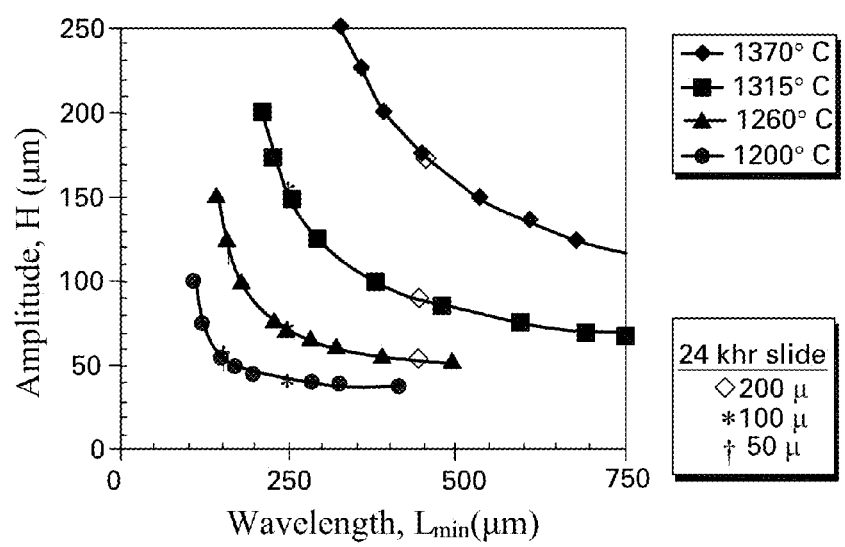
FIG. 10 depicts the amplitude and wavelength of the surface features of the bondcoat required to suppress large creep displacement at various temperatures over a 24,000 hour period.
Figure 11:
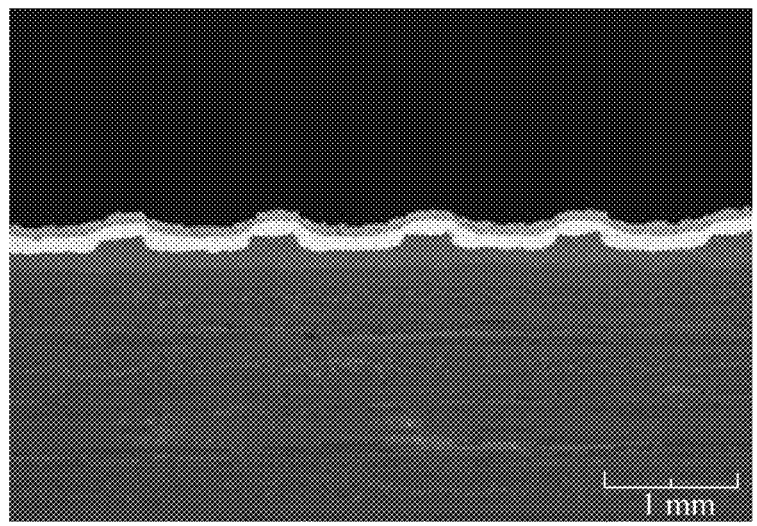
FIGS. 11-22 are photographs of engineered surfaces according to the present technology.
Figure 12:
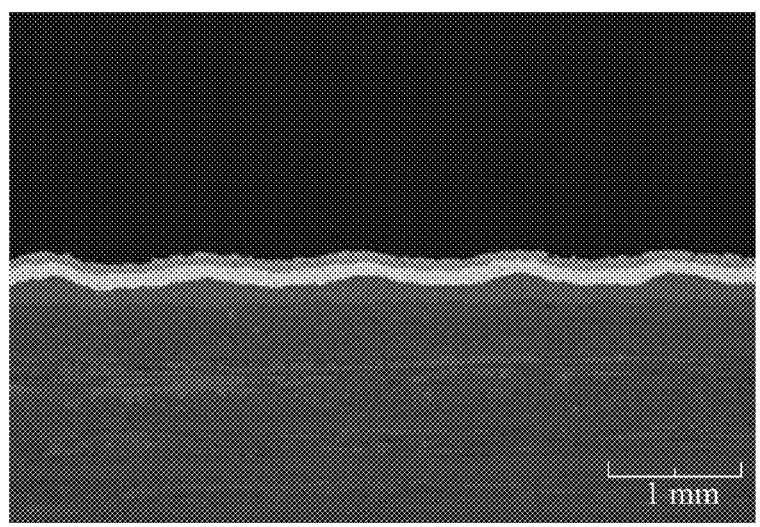
Figure 13:
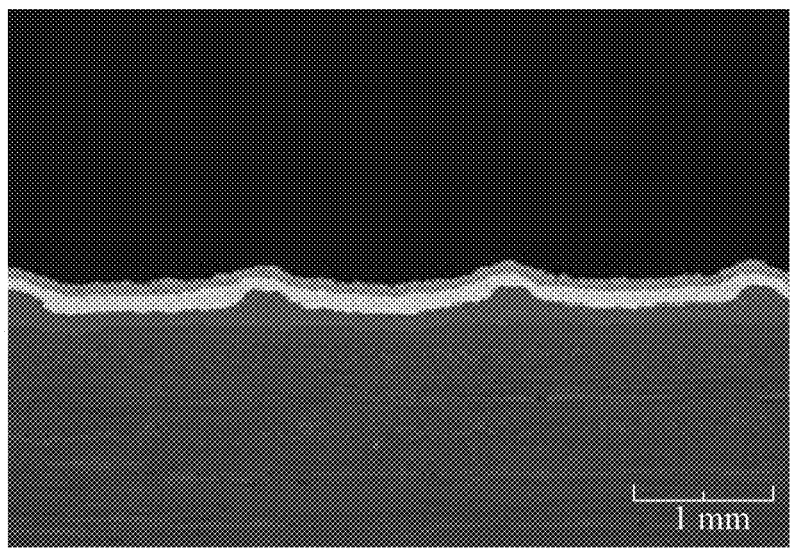
Figure 14:
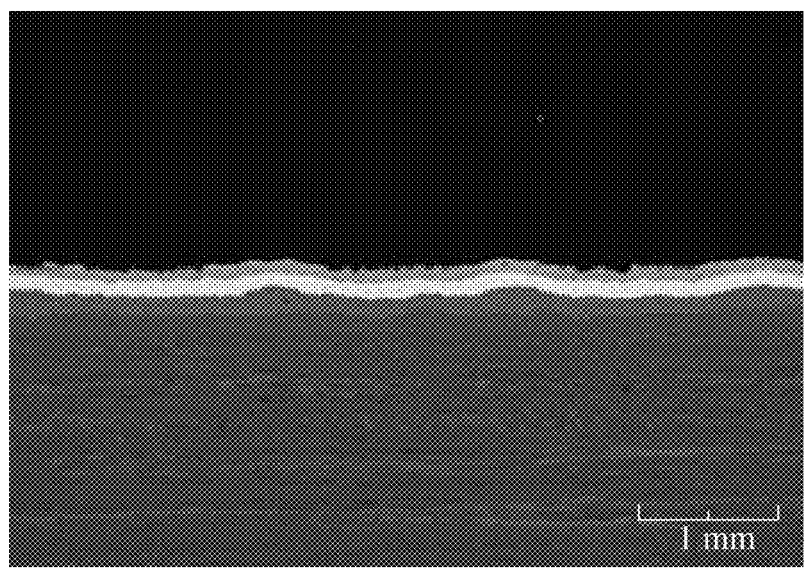
Figure 15:
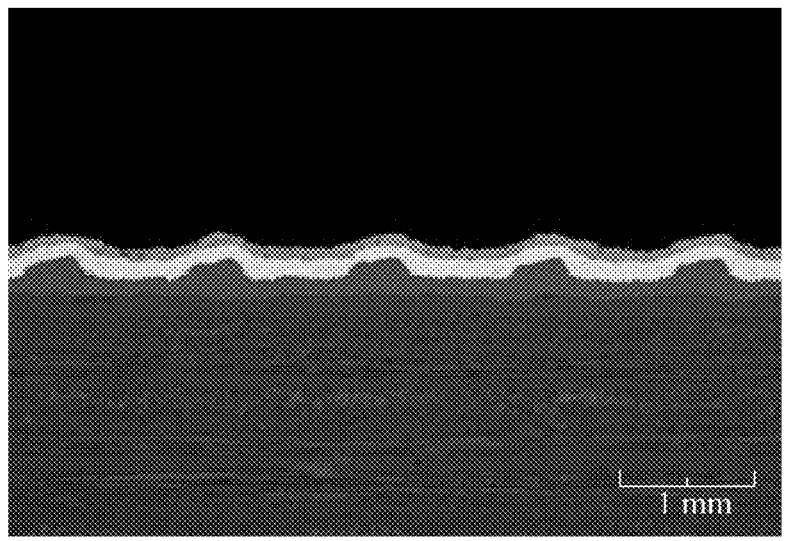
Figure 16:
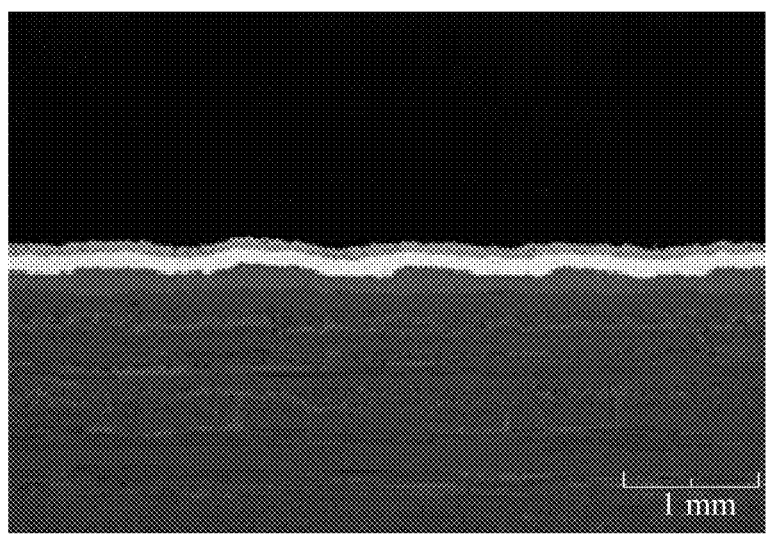
Figure 17:
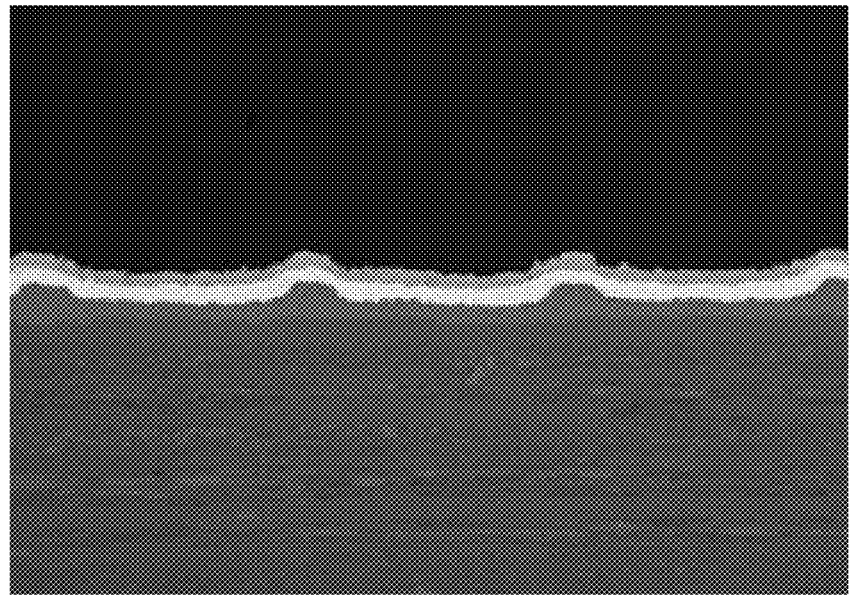
Figure 18:
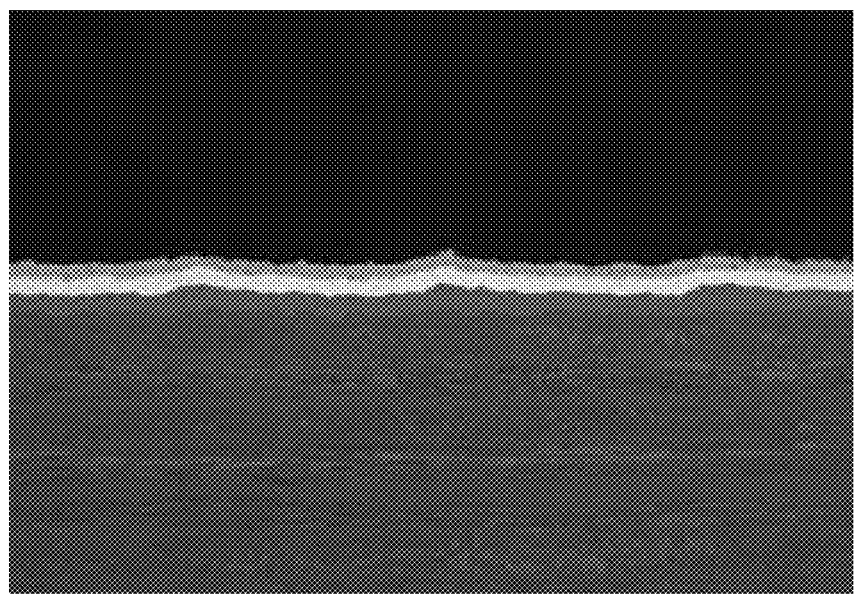
Figure 19:
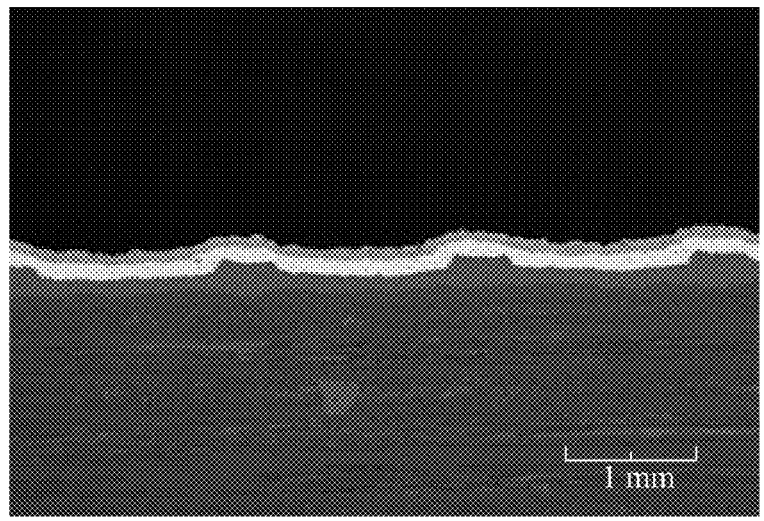
Figure 20:
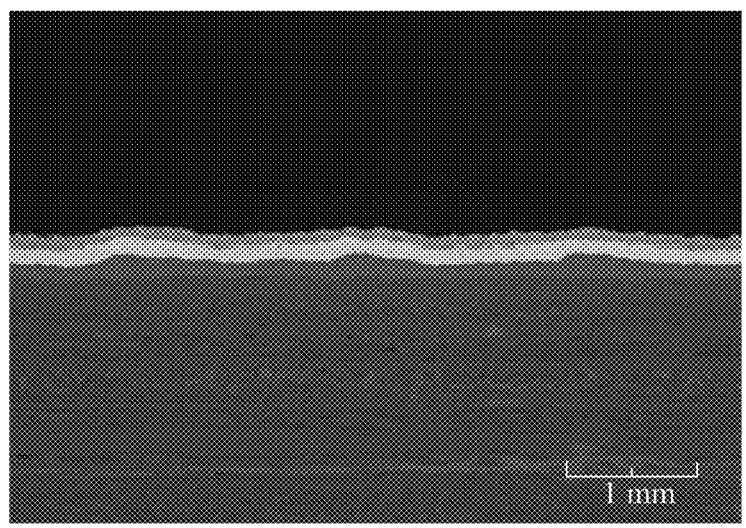
Figure 21:
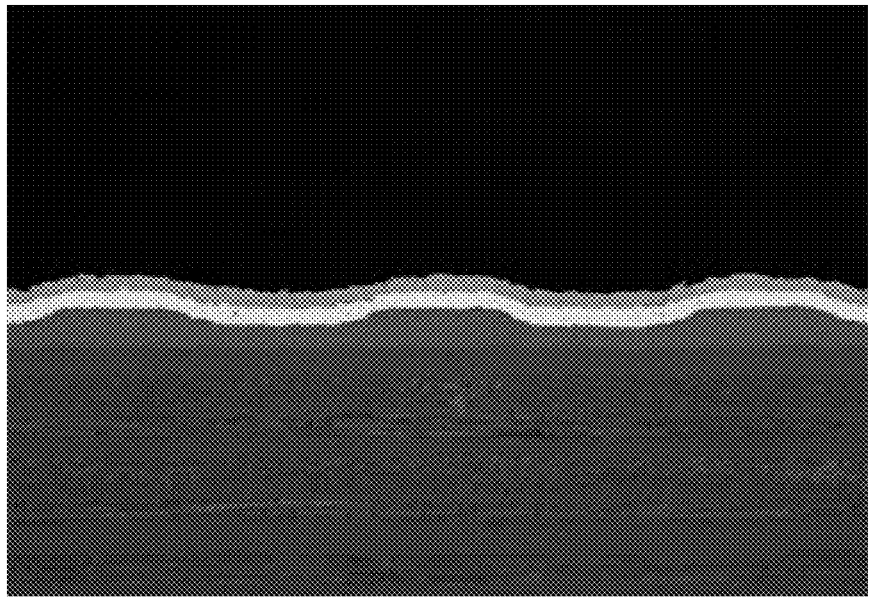
Figure 22:
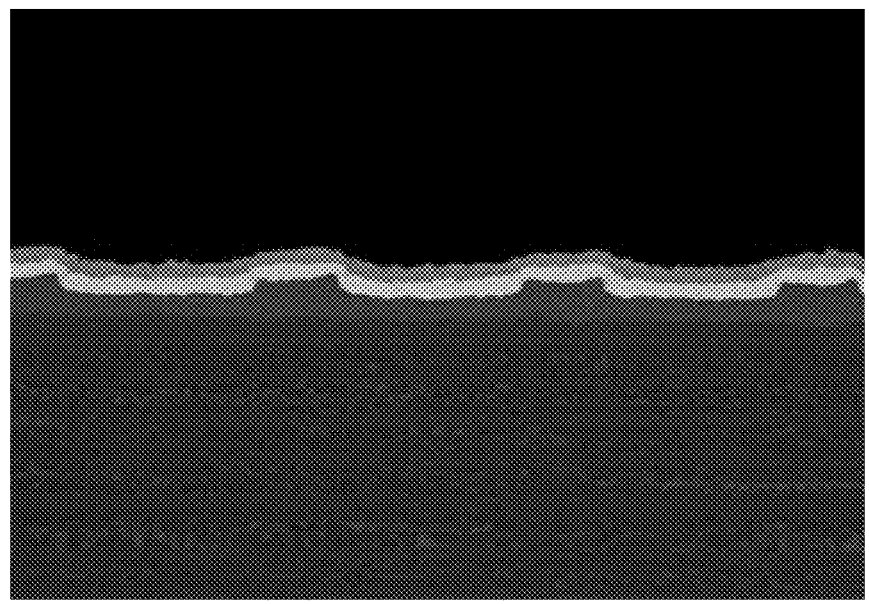

The results of the models are shown in FIG. 8 which depicts the leading edge thickness $h_{lead}$ and the trailing edge thickness $h_{trail}$ of the constituent layer 12 and the resulting sliding displacement s (μm) of the EBC system 22 for the conditions shown and a shear stress of τ=0.25 MPa. As shown in FIG. 8, the sliding displacement s of the EBC system 22 becomes oxidation-rate limited as opposed to $SiO_2$ creep-rate limited and the sliding closely tracks about half the difference in oxide thicknesses on the ridge walls. As shown in FIG. 10, the creep of the EBC system as a result of shear on the constituent layer requires both the amplitude and wavelength of the surface features 24 to meet a minimum requirement.

Figure 9:
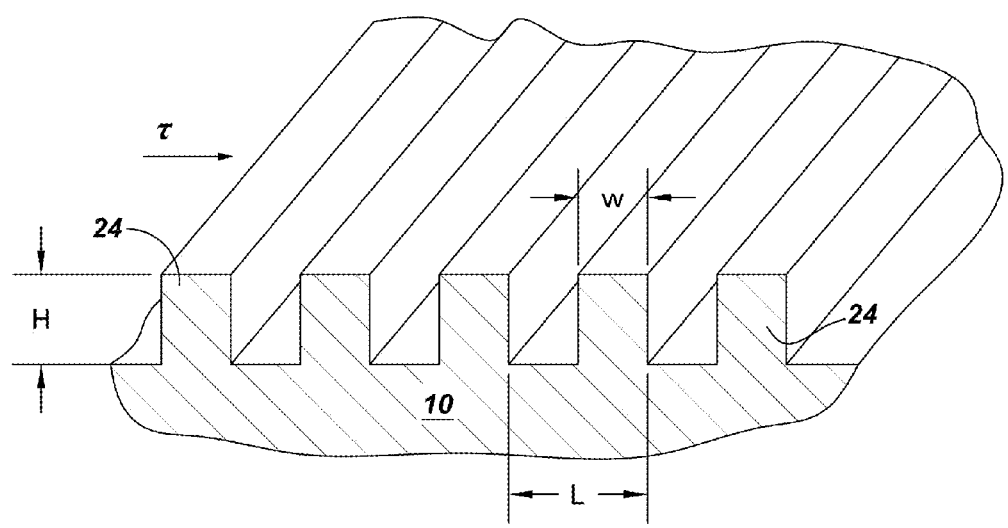
FIG. 9 schematically depicts an engineered surface of a substrate of an article or component according to one example of the present technology.

Referring to FIG. 9, the engineered surface of the bondcoat 10 (or substrate) may include a plurality of ridges 24 that are provided substantially perpendicular to the direction of shear loading τ. The ridges 24 may have a wavelength L and a span W that defines a α of W/L. The α may be from about 0.1 to about 0.9, for example from about 0.2 to about 0.8, for example about 0.4 to about 0.6. Although the ridges 24 are shown as being generally square in cross section and extending substantially perpendicular to the shear loading direction (i.e. in a substantially chordwise direction), it should be appreciated that the engineered surfaces, i.e. ridges 24, may have other cross sectional shapes, e.g. rectangular, trapezoidal, or any generally sinusoidal or wavy-shaped configuration. Although the examples show the features 24 perpendicular to the shear stress, the features ay be provided at an angle to the shear loading direction, e.g. up to about 45° to the shear loading direction. It should also be appreciated that although the engineered surfaces are shown as periodic and continuous, the surfaces may be non-periodic and/or non-continuous. It should further be appreciated that the engineered surfaces may be provided as sets of intersecting surfaces, e.g. diamond shaped, that may be up to 45°.

FIGS. 3-7 and 9 schematically illustrate the engineered surfaces according to the present technology. FIGS. 11-22 illustrate actual engineered surfaces according to the present technology formed according to the processes disclosed in co-pending, commonly assigned U.S. application Ser. No. 14/068,840 entitled, "METHODS OF MANUFACTURING SILICA-FORMING ARTICLES HAVING ENGINEERED SURFACES TO ENHANCE RESISTANCE TO CREEP SLIDING UNDER HIGH-TEMPERATURE LOADING" the entire contents of which are incorporated herein by reference.

The ridges 24 may have a height of from about 10 to about 250 μm, for example about 50 to about 200 μm, for example about 75 to about 1250 μm, for example about 100 μm, though the dimensions may depend on the maximum anticipated thickness of the constituent layer 12 and other factors associated with the particular application. The ridges 24 may have a wavelength L of from about 20 to about 10,000 μm and particularly about 50 to about 2,000 μm, or for example about 250 to about 1,000 μm. The constituent layer thickness $h_{con}$ may be from about 4 to about 40 μm.

It is to be understood that not necessarily all such objects or advantages described above may be achieved in accordance with any particular example. Thus, for example, those skilled in the art will recognize that the systems and techniques described herein may be embodied or carried out in a manner that achieves or optimizes one advantage or group of advantages as taught herein without necessarily achieving other objects or advantages as may be taught or suggested herein.

While only certain features of the present technology have been illustrated and described herein, many modifications and changes will occur to those skilled in the art. It is, therefore, to be understood that the appended claims are intended to cover all such modifications and changes.

The invention claimed is:

1. An article, comprising:
    a substrate that contains silicon carbide, silicon nitride, a silicide and/or silicon as a reinforcement phase and/or a matrix phase;
    a bondcoat overlying the substrate, wherein the bondcoat is formed of a material containing elemental silicon; silicon with one or more additional metal, intermetallic and/or ceramic phases; and/or one or more silicon alloys or compounds;
    at least one outer layer overlying the bondcoat, wherein the at least one outer layer contains rare earth silicates and/or aluminosilicates; and
    a constituent layer on the surface of the bondcoat and between and contacting the bondcoat and the at least one outer layer, the constituent layer being formed by constituents of the bondcoat and being susceptible to creep within an operating environment of the article, wherein the bondcoat defines a plurality of channels and a plurality of ridges that interlock within a plurality of channels formed in the at least one outer layer to physically interlock the at least one outer layer with the bondcoat through the constituent layer and the ridges have a height of from about 50 to about 200 μm, a wavelength of from about 250 to about 1,000 μm, a ratio of a span of each ridge to the wavelength of the ridges of about 0.2 to about 0.8 and a thickness of the constituent layer is between about 4 to about 40 μm.

2. The article according to claim 1, wherein the ridges have a height of from about 75 to about 125 μm.

3. The article according to claim 1, wherein the bondcoat consists essentially of elemental silicon.

4. The article according to claim 1, wherein the bondcoat consists essentially of silicon with one or more additional ceramic phases chosen from the group consisting of silicon carbide and silicon nitride.

5. The article according to claim 1, wherein the aluminosilicates comprise mullite and/or an alkaline earth aluminosilicate.

6. The article according to claim 5, wherein the alkaline earth aluminosilicate comprises BSAS.

7. The article according to claim 1, wherein the substrate is a ceramic matrix composite material containing silicon carbide as a reinforcement phase and/or a matrix phase.

8. The article according to claim 1, wherein the silicide is a refractory metal silicide or a transition metal silicide.

9. The article according to claim 1, wherein the constituent layer comprises amorphous silica or crystalline silica or mixtures thereof.

10. The article according to claim 1, wherein the article is a rotating component of a turbine engine and the ridges extend in a direction substantially perpendicular to a shear load applied to the article during rotation of the article.

11. The article according to claim 10, wherein a thickness of the constituent layer varies from a leading edge thickness to a trailing edge thickness with respect to the direction of the applied shear load.

* * * * *